United States Patent
Nakagawa et al.

(10) Patent No.: US 7,927,914 B2
(45) Date of Patent: Apr. 19, 2011

(54) MANUFACTURING METHOD FOR SEMICONDUCTOR PHOTOELECTROCHEMICAL CELL AND SEMICONDUCTOR PHOTOELECTROCHEMICAL CELL

(75) Inventors: Yoshinori Nakagawa, Katsuragi (JP); Kiyohisa Wada, Yamatotakada (JP)

(73) Assignee: Shiken Co., Ltd., Osaka (JP)

( * ) Notice: Subject to any disclaimer, the term of this patent is extended or adjusted under 35 U.S.C. 154(b) by 1093 days.

(21) Appl. No.: 11/463,551

(22) Filed: Aug. 9, 2006

(65) Prior Publication Data

US 2007/0034253 A1    Feb. 15, 2007

(30) Foreign Application Priority Data

Aug. 10, 2005   (JP) .................. 2005-231668

(51) Int. Cl.
*H01L 21/00* (2006.01)
(52) U.S. Cl. ........ 438/104; 438/171; 438/584; 438/768; 257/E21.079; 257/E21.168
(58) Field of Classification Search .................. 438/765, 438/768, 773, 171, 190, 92; 257/E21.079, 257/E21.082, E21.282, E21.284, E21.287
See application file for complete search history.

(56) References Cited

U.S. PATENT DOCUMENTS

| 4,511,638 | A | 4/1985 | Sapru et al. | |
| 6,344,127 | B1 * | 2/2002 | Itoh | 205/171 |

FOREIGN PATENT DOCUMENTS

| CA | 1340573 | | 6/1999 |
| JP | 51-107074 | | 9/1976 |
| JP | 58-26623 | | 2/1983 |
| JP | 60-12682 | | 1/1985 |
| JP | 4082570 | A | 3/1992 |
| JP | 6-90824 | | 4/1994 |
| JP | 9-228022 | | 9/1997 |
| JP | 2000219513 | A * | 8/2000 |
| JP | 2000-271493 | A | 10/2000 |
| TW | 1555753 | | 5/1978 |

OTHER PUBLICATIONS

Bodyako et al., "Oxidation of the titanium alloy VT9 during rapid heating," Abstarct, 1983.*
Akira Fujishima, et al., Electrochemical Photolysis of Water at a Semiconductor Electrode, Nature, vol. 238, No. 5358, pp. 37-18, Jul. 7, 1972.
T. Sakata, et al., Photochemical Diode Model of Pt/TiO2 Particle and its Photocatalytic Activity, Chemical Physics Letters, vol. 88, No. 1, pp. 50-54, Apr. 23, 1982.
C. Luca, et al., Photoelectrochemical Behaviour of the TiO2 Semiconductor Electrodes Obtained by Thermal Oxidation of the Titanium Foils, Revue Roumaine de Chimie, vol. 39, No. 4, pp. 355-363, 1994.

(Continued)

*Primary Examiner* — Cheung Lee
(74) *Attorney, Agent, or Firm* — Knobbe, Martens, Olson & Bear, LLP

(57) ABSTRACT

The invention provides a manufacturing method for a semiconductor photoelectrochemical cell, comprising the steps of burning a base made of titanium or a titanium alloy in an atmosphere of 700° C. to 1000° C. at a rate of temperature increase of no lower than 5° C./second so that a titanium oxide layer is formed on the surface, and thus, mixing titanium metal into said titanium oxide layer.

10 Claims, 3 Drawing Sheets

OTHER PUBLICATIONS

P.A. Christensen, et al., Observation of an optical phonon band in situ in TiO2 electrochemistry: a possible indicator of strongly trapped intermediates in the O2 evolution reaction, Chemical Physics Letters, vol. 344, No. 5, 6, pp. 488-494, Aug. 31, 2001.

G. Bertand, et al., Morphology of Oxide Scales Formed on Titanium, Oxidation of Metals, vol. 21, Nos. 1-2, Feb. 1984, pp. 1-19, XP002522539.

K. J. Harting, et al., Production and Testing Methods of Different TiO2 Photoanodes, International Journal of Hydrogen Energy, vol. 11, No. 12, Jan. 1, 1986, pp. 773-781, XP025450495.

Taro Toyada, et al., Photoacoustic, photoelectrochemical current, and photoluminescence spectra of highly porous, polycrystalline TiO2 electrodes fabricated by chemical synthesis, Material Science and Engineering B78, Dec. 15, 2000, pp. 84-89, XP004227446.

Office Action issued by Canadian Patent Office on Mar. 2, 2010 for counterpart Canadian Patent Application No. 2,554,913.

Zu, Yan-Ning, et al., A Study of Titanium Dioxide Electrodes for the Photoassisted Electrolysis of Water, The Institute of Photographic Chemistry, Academia Sinica, Jan. 1981, vol. 2.

Leng Wenhua, et al., A Study of Titanium Oxide Film Electrodes Prepared by Direct Thermal Oxidation, I. Preparation, Structure and Electrochemical Properties, Chinese Journal of Chemical Physics, vol. 14, No. 6, Dec. 2001.

Yang Hongjun, et al., Preparation of n-TiO2 Semiconductor Photoanode and Study of Its Photoelectrochemical Behavior, Apr. 1983.

Office Action issued by Taiwanese Patent Office on Nov. 27, 2009 for counterpart Taiwanese Patent Application No. 095122881.

* cited by examiner

MANUFACTURING METHOD FOR SEMICONDUCTOR PHOTOELECTROCHEMICAL CELL AND SEMICONDUCTOR PHOTOELECTROCHEMICAL CELL

BACKGROUND OF THE INVENTION

1. Field of the Invention

The present invention relates to a manufacturing method for a semiconductor photoelectrochemical cell and a semiconductor photoelectrochemical cell, and in particular, to a manufacturing method for a semiconductor photoelectrochemical cell having photocatalyst effects and a semiconductor photoelectrochemical cell which is manufactured in accordance with this method.

2. Description of the Related Art

When light hits single crystal or microscopic particles of an N type oxide semiconductor such as titanium oxide in an electrolyte solution as shown in FIG. 5, electrons in a valence band (V.B) are excited and move to a conduction band (C.B). An oxidation reaction (Red→Ox) occurs in the vicinity of holes ($h^+$) from which electrons have been removed in the valence band while a reduction reaction (Ox→Red) occurs in the vicinity of the conduction band where the excited electrons ($e^-$) exist.

In the contact interface between the electrolyte solution and the semiconductor, however, the band curves due to a Schottky barrier, so that no reduction reaction occurs unless electrons move over this barrier. Therefore, only a slight amount of electrons contribute to the reduction reaction, and accordingly, the oxidation reaction occurs only slightly.

It was clarified in 1972, however, that electrolysis of water due to light can be induced by using platinum for the counter electrode in a semiconductor photoelectrochemical cell (NATURE Vol. 238, No. 5358, pp. 37-38 (1972)). In addition to this, it is known that similar effects can be gained by connecting platinum electrodes to titanium oxide single crystal or making microscopic particles of titanium oxide carry microscopic particles of platinum (CHEMICAL PHYSICS LETTERS Vol. 88, No. 1, pp. 50-54 (1982)). In this case, platinum is made to be carried using a method where a substance gained by reducing titanium oxide immersed in a platinic acid with formaldehyde is heated at a high temperature.

According to the above described prior art, however, in any event, expensive platinum is used for electrodes, and the manufacturing method for electrodes is also complicated, so that it is hard to say that the art is practical. After the above described findings, one of the present inventors developed a method according to which titanium is burned at 700° C. to 800° C. and thereby N type semiconductor having anatase type crystal can be generated, and titanium is burned at 1200° C. to 1500° C. and thereby N type semiconductor having rutile type crystal can be fabricated (Japanese Unexamined Patent Publication No. H6 (1994)-90824), buy in this case, efficient photocatalyst effects cannot be provided by mixing an appropriate amount of titanium metal in a titanium oxide layer that is formed on the surface after burning.

Furthermore, though an invention relating to a method for manufacturing a photocatalyst material by carrying out anodic oxidation on titanium metal and burning this in an atmosphere of 500° C. has been proposed (Japanese Unexamined Patent Publication No. 2000-271493), the preprocessing is complicated, and thus, this cannot be said to be a simple or practical method.

SUMMARY OF THE INVENTION

Therefore, an object of the present invention is to provide, in view of the problems with the above described prior art, a manufacturing method for a semiconductor photoelectrochemical cell which can be manufactured in accordance with a simple method without using an expensive precious metal and has excellent photocatalyst effects, as well as a semiconductor photoelectrochemical cell that is manufactured in accordance with this method.

The above described object is achieved by the inventions. That is to say, the manufacturing method for a semiconductor photoelectrochemical cell according to the present invention is characterized by providing such a configuration that a base made of titanium or a titanium alloy is burned in an atmosphere of 700° C. to 1000° C. with a rate of temperature increase of no less than 5° C./second, so that a titanium oxide layer is formed on the surface and titanium metal is mixed in the above described titanium oxide layer.

In this configuration, a semiconductor photoelectrochemical cell having excellent photocatalyst effects in which no expensive material such as a precious metal is used for an electrode, and a photocatalyst reaction which is more reactive than those gained in the prior art occurs when irradiated with light, so that a large electromotive current flows, can be gained.

As shown in FIG. 1, titanium metal is adjacent to titanium oxide in the structure of a cell according to the present invention, and therefore, in the interface, no Schottky barrier as that in the contact interface between the electrolyte solution and the semiconductor is formed, and therefore, electrons that receive light energy can be easily excited to a conduction band, an efficient reduction reaction occurs in the titanium metal portion, and an efficient oxidation reaction occurs in the semiconductor portion. This is different from the prior art, where, as shown in FIG. 5, a Schottky barrier is formed in the entirety of the contact interface between the entire surface of the semiconductor and the electrolyte solution. Accordingly, in the case of the cell according to the present invention, the efficiency of the photocatalyst reaction becomes significantly higher in comparison with the prior art, so that a greater electromotive current is generated for a same intensity of irradiated light, or an efficient photocatalyst reaction occurs for a smaller amount of irradiated light. In a case where the temperature for burning is lower than 700° C., the efficiency of generation of titanium oxide as an N type oxide semiconductor is poor, and sufficient photocatalyst effects cannot be gained, and in a case where the temperature for burning exceeds 1000° C., photocatalyst effects cannot be gained either. The temperature for burning preferably exceeds 810° C. and is no higher than 1000° C. In addition, in a case where the rate of temperature increase at the time of burning is lower than 5° C./second, an appropriate amount of titanium metal cannot be mixed into the titanium oxide layer that is generated on the surface of the base after burning, which is not preferable.

As a result, a manufacturing method for a semiconductor photoelectrochemical cell which is manufactured in accordance with a simple method without using an expensive precious metal and has excellent photocatalyst effects, can be provided.

In addition, the manufacturing method for a semiconductor photoelectrochemical cell according to the present invention may be characterized by providing such a configuration that a base made of titanium or a titanium alloy is burned in an atmosphere of 900° C. to 1000° C. to form a titanium oxide layer on the surface, and after that, quenched in cold water to mix titanium metal in the above described titanium oxide layer.

Also in this configuration, a semiconductor photoelectrochemical cell having excellent photocatalyst effects in which no expensive material such as a precious metal is used for an electrode and a photocatalyst reaction having higher activity than that gained in the prior art occurs when irradiated with light, and a large electromotive current flows, can be gained. In this case, the temperature for burning is high, and therefore, generated oxide coating layer having high insulating properties can be easily removed through quenching, so that titanium metal can be mixed into the titanium oxide layer in the lower structure. It is preferable for such cold water to be no warmer than 10° C.

It is preferable to additionally carry out mechanical processing in order to partially remove the above described generated titanium oxide layer, so that the surface area of titanium metal in the above described titanium oxide layer becomes 10% to 30%.

In this configuration, a titanium metal layer can be surely exposed from the titanium oxide layer. Thereby, for the mechanical processing, such a method for partially removing the titanium oxide layer by creating slits using a polisher or the like or filing or cutting the surface of the titanium oxide layer using a jig such as a file or a cutting tool, may be adopted. In addition, in the case where the surface area of titanium metal that has been exposed from the above described titanium oxide layer is 10% to 30% of the surface area of the titanium oxide layer, stable and efficient photocatalyst effects can be gained. In a case where the surface area of titanium metal is less than 10%, it is difficult to gain efficient photocatalyst effects, while in a case where the surface area of titanium metal exceeds 30%, photocatalyst effects gained from the titanium oxide layer are reduced.

The configuration of the semiconductor photoelectrochemical cell according to the present invention is characterized in that the semiconductor photoelectrochemical cell is manufactured in accordance with a manufacturing method for a semiconductor photoelectrochemical cell according to the present invention.

In this configuration, a semiconductor photoelectrochemical cell which is manufactured in a simple method without using an expensive precious metal and has excellent photocatalyst effects can be provided.

DETAILED DESCRIPTION OF THE PREFERRED EMBODIMENTS

Figure 2:
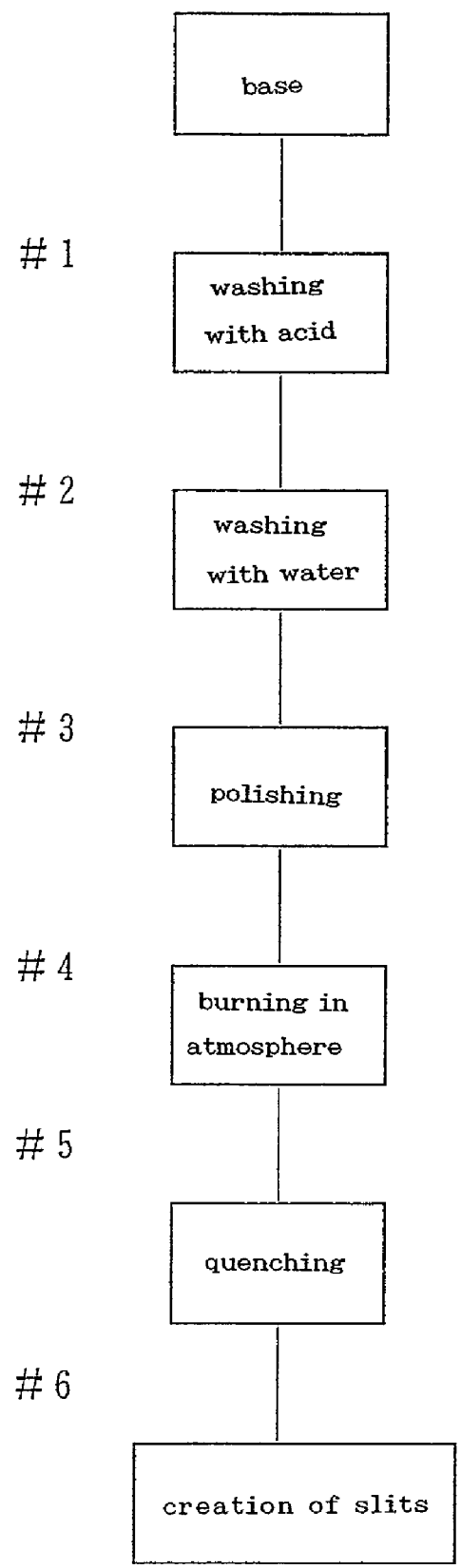
FIG. 2 is a flow chart schematically showing a manufacturing process for the semiconductor photoelectrochemical cell of FIG. 1.

The embodiments of the present invention are described in detail with reference to the drawings. FIG. 2 is a flow chart schematically showing a manufacturing process for a semiconductor photoelectrochemical cell according to the present embodiment.

Titanium or a titanium alloy can be used for a base used for a semiconductor photoelectrochemical cell according to the present embodiment, and an appropriate form thereof can be selected in accordance with the application with no particular limitations, like plate form, rod form or bulb form. An example using pure titanium (purity: no lower than 99.0%) in rod form is cited in the description.

First, it is preferable to wash with acid the base made of titanium in rod form in advance (#1). The washing with acid can be carried out in accordance with a conventional, known method, for example, by immersing the base in 5 wt % to 10 wt % of a hydrofluoric acid solution for a predetermined period of time.

After stains and the like on the surface of the base is washed with acid and removed, the base is sufficiently washed with water (#2) and polished so that the surface become smoother, if necessary (#3).

Then, the base is burned in the atmosphere (#4), so that a coating film of titanium oxide is formed on the surface of the base. The temperature for heating is 700° C. to 1000° C., and more preferably, exceeds 810° C. and is no higher than 1000° C. Such temperature is kept for one minute to two hours, more preferably 4 minutes to 30 minutes.

After keeping the base at a predetermined temperature for a predetermined period of time, the base is quenched in cold water of no warmer than 10° C. (#5), so that cracking occurs in the titanium oxide coating film that is formed on the surface of the base, and thus, the oxide coating film is partially removed. Though the coating film naturally falls off in many cases, it may be mechanically removed if necessary. As a result, the surface of the base has a structure where titanium oxide and titanium metal coexist. In this case, the thickness of the titanium oxide coating film is approximately 0.1 μm to 30 μm, and more preferably, approximately 0.5 μm to 10 μm.

Next, slits are created on the base where the titanium oxide coating film has been formed using a polisher or the like (#6). This is for surely and stably exposing titanium metal from the surface of the base, and an appropriate form and number of slits can be selected, and it is preferable to create silts in such a manner that the surface area of the exposed titanium metal becomes approximately 10% to 30% of the titanium oxide layer. In the case where the exposed area of titanium metal is greater than this, the photocatalyst effects of the titanium oxide become smaller, which is not preferable. The step of creating slits, however, is not always necessary, and may be omitted when the exposed area of titanium metal is made great by quenching the base after the base is burned at a high temperature.

EXAMPLES

<Burning Test>

Example 1

A pure titanium (99.5 wt %) rod having a diameter of approximately 3 mm and a length of approximately 80 mm was used as a base. This base was washed with an acid, that is, a hydrofluoric acid solution, in advance and dried, and after that, heated and burned in an atmosphere of 1000° C. for 4 minutes to 30 minutes at a rate of temperature increase of 7° C./second in an electrical furnace, and then quenched in cold water of approximately 10° C. The ratio of exposure of titanium metal on the surface of the titanium oxide layer was found from the surface area of the base after X ray images of Ti and O were taken using an EPMA (JXA-8800RM, made by JEOL Ltd.). In the case of Example 1, the outermost surface layer having high insulating properties was removed through quenching, and approximately 20% of titanium metal was mixed into the titanium oxide layer in the lower structure portion.

Example 2

The same processing as that in Example 1 was carried out, except for that the rate of temperature increase was set at 5° C./second and the sintering temperature was set at 810° C. In Example 2, though the outermost surface layer was not removed through quenching, titanium oxide on the generated surface did not have high insulating properties, and it was found that approximately 20% of titanium metal was mixed into the titanium oxide layer when the structure was observed.

Example 3

The same processing as that in Example 2 was carried out, except for that the temperature for burning was set at 700° C. The outermost surface layer was not removed in this example, even through quenching, as in Example 2.

Comparative Example 1

The same processing as that in Example 2 was carried out, except for that the temperature for burning was set at 1200° C. In this case, though the uttermost surface layer having high insulating properties was removed through quenching as in Example 1, almost no titanium metal was mixed into the titanium oxide layer in the lower structure portion.

Comparative Example 2

The same processing as that in Example 2 was carried out, except for that the temperature for burning was set at 500° C. In this case, the outermost surface layer was not removed even through quenching, as in Examples 2 and 3, and generation of the titanium oxide layer was insufficient.

Figure 1:
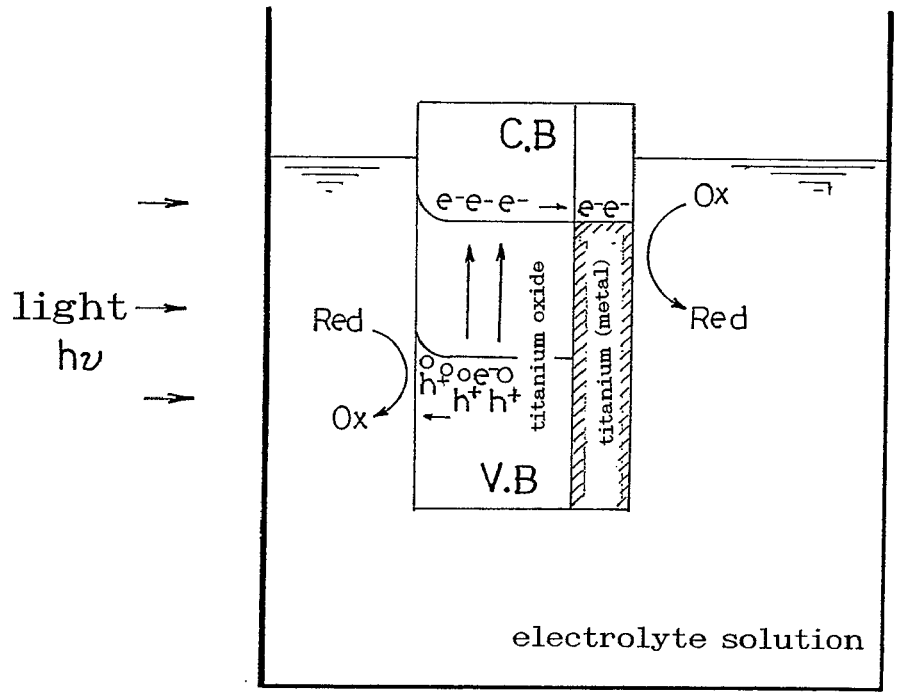
FIG. 1 is a diagram showing a photocatalyst reaction in a semiconductor photoelectrochemical cell according to the present invention.
Figure 3:
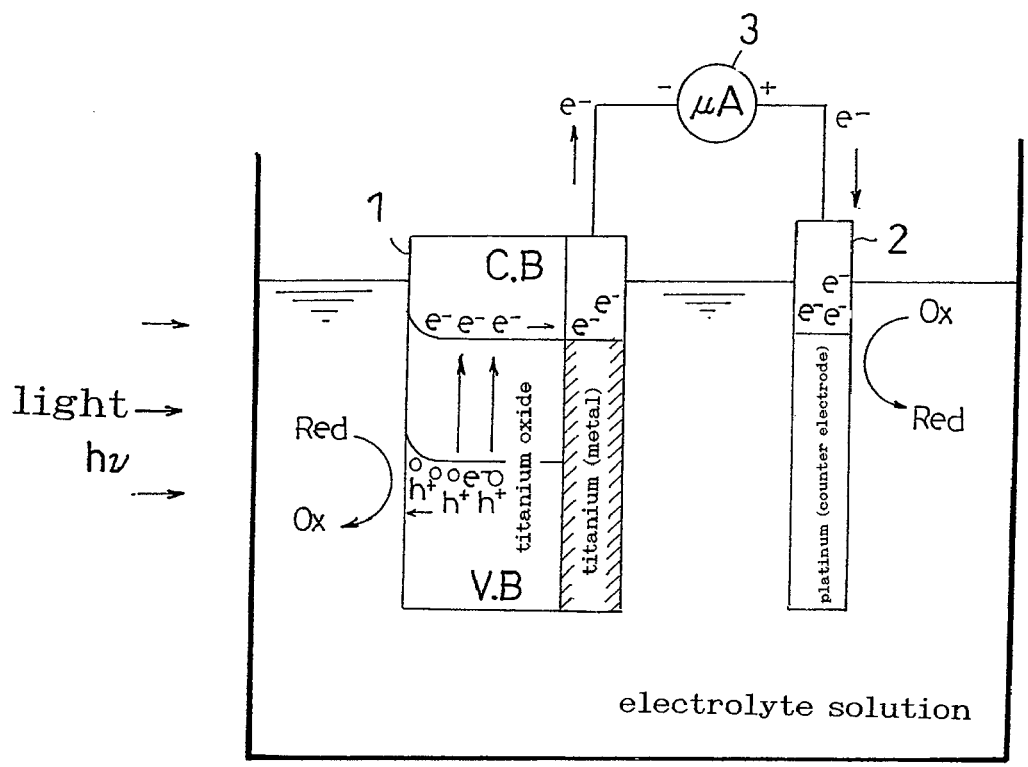
FIG. 3 is a is a diagram showing a method for measuring an electromotive current in the examples and comparative examples.

The electromotive current was measured for each of Examples 1 to 3 and Comparative Examples 1 and 2 in accordance with the following method. That is to say, a sample of each of the above described examples and comparative examples was put into a container containing a 0.1% saline solution as an electrolyte solution, and an electrode in rod form where platinum was plated on a titanium metal was used as a counter electrode 2. As shown in FIG. 3 (showing only an example where Example Sample 1 is used), these two electrodes 1 and 2 were electrically connected to each other via a current meter 3, and this was used with the light source (light energy: hv) of a fluorescent lamp (6 W), so that the flowing current was measured. The results of measurement are shown in Table 1.

It can be seen from Table 1 that an electromotive current of which the level is higher than that of the comparison examples was generated in Examples 1 to 3, where the base was heated at a temperature of 700° C. to 1000° C. for 4 minutes to 30 minutes. It is more preferable for the base to be burned at 810° C. to 1000° C.

<Effects of Quenching>

Next, Table 2 shows the results of measurement of an electromotive current in the case where the sample of Embodiment 1 was quenched in cold water of no warmer than 10° C., as well as in the case where the sample was naturally cooled in the atmosphere after being taken out of the furnace. In the case where the sample was not quenched after being burned at 1000° C., a thick titanium oxide coating film covered the surface, preventing an appropriate amount of titanium oxide from being mixed into a titanium metal, and a great electromotive current could not be generated.

In addition, in the case where the temperature for burning was 700° C. to 810° C., though no titanium oxide coating film was removed through quenching, an appropriate amount of titanium oxide and titanium metal could be mixed into the surface, and a large amount of photoelectromotive current could be generated, due to the high rate of temperature increase (no less than 5° C./second), in addition to the above.

<Effects of Rate of Temperature Increase>

Table 3 shows the effects of the rate of temperature increase. In the case where the rate of temperature increase was lower than 5° C./second when the base was burned in an atmosphere of 700° C. to 1000° C., an appropriate amount of titanium metal could not be mixed into the titanium oxide layer that was generated on the surface of the base after burning, and a large amount of photoelectromotive current could not be generated. In particular, in the case of lower than 900° C. (700° C. to 810° C.), a large amount of photoelectromotive current could not be generated when the rate of temperature increase was low.

<Lactic Acid Decomposing Test>

Figure 4:
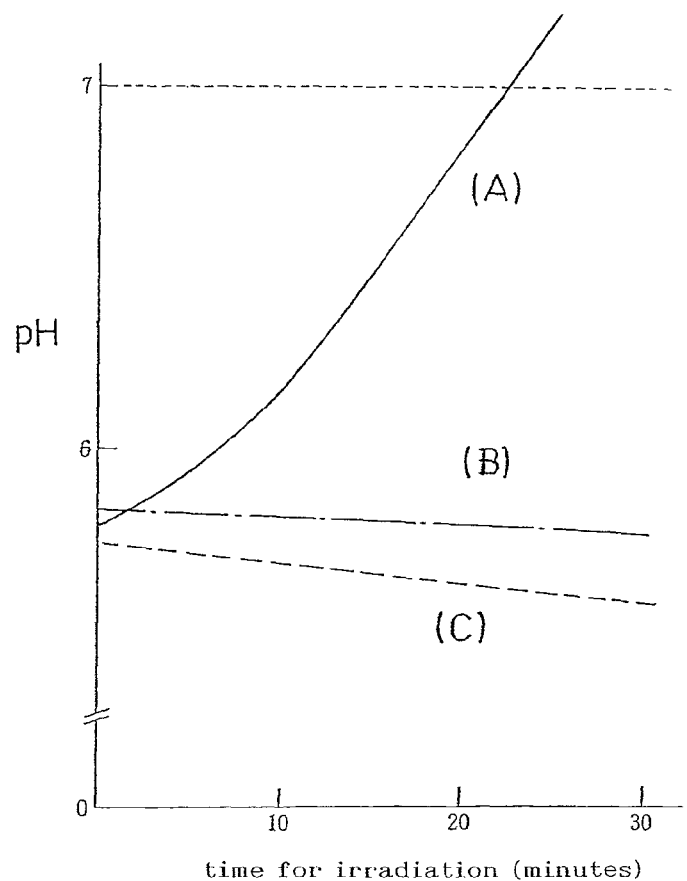
FIG. 4 is a graph showing a change in pH indicating decomposition of lactic acid by the semiconductor photoelectrochemical cell of FIG. 1.
Figure 5:
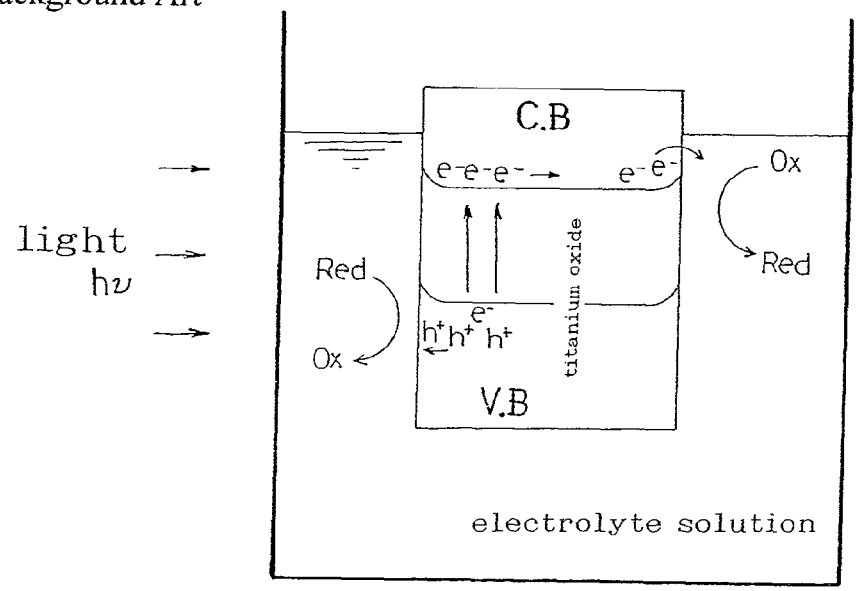
FIG. 5 is a diagram showing a photocatalyst reaction in the semiconductor photoelectrochemical cell according to the prior art.

Next, a lactic acid decomposing test was carried out using the sample of the above described Example 2 (of which the time for burning was 4 minutes). Lactic acid was diluted to 0.01% with 0.3 M of a potassium sulfate solution, and furthermore, sodium hydroxide was added, and thereby, the pH was adjusted to 5.7. The sample of Example 2 was put into 2 mL of this lactic acid solution, and this was irradiated with light from a 20 W chemical lamp from a distance of 2.5 cm (A). The pH was measured using a commercially available pH meter (M-8, made by Horiba, Ltd.). For the purpose of comparison, the change in the pH in the case where the sample of Example 2 was put into the above described lactic acid solution but this was not irradiated with light (B) is shown together with the change in pH of only the above described lactic acid solution (C). Here, in order to accelerate mixing of the solution, bubbling with oxygen was used. FIG. 4 shows the change in the pH during the course of irradiation in this case.

It can be seen from FIG. 4 that decomposition of lactic acid in the lactic acid solution into which the sample of the above described Example 2 was put progressed when irradiated with light, and in this case, it can also be seen that the photocatalyst reaction surely progressed. In this case, lactic acid decomposed through a photocatalyst reaction so as to change to pyruvic acid, as shown in the following formulas. Furthermore, generated hydrogen ions were reduced by electrons (e⁻) in a conduction band of titanium metal, and the pH increased.

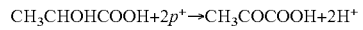

$$CH_3CHOHCOOH + 2p^+ \rightarrow CH_3COCOOH + 2H^+$$

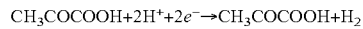

$$CH_3COCOOH + 2H^+ + 2e^- \rightarrow CH_3COCOOH + H_2$$

[Other Embodiments]

(1) Though pure titanium is cited as an example of a base in the description of the above described embodiments, various types of titanium alloys, such as titanium-aluminum-vanadium alloys, titanium-molybdenum-zirconium alloys and titanium-aluminum-tin alloys can be used as the base in the present invention.

(2) A semiconductor photoelectrochemical cell according to the present invention can be widely used in the food industry, chemical industry, medical industry, environmental equipment industry and the like, because of its photocatalyst effects.

TABLE 1

| | Temperature for burning (° C.) | Time for burning (minutes) | Photoelectromotive current (μA) |
|---|---|---|---|
| Example 1 | 1000 | 4 | 24.0 |
| | 1000 | 30 | 9.7 |
| Example 2 | 810 | 4 | 15.8 |
| | 810 | 30 | 9.2 |
| Example 3 | 700 | 4 | 7.2 |
| | 700 | 30 | 8.0 |
| Comparative Example 1 | 1200 | 4 | 5.1 |
| | 1200 | 30 | 6.9 |
| Comparative Example 2 | 500 | 4 | 2.8 |
| | 500 | 30 | 3.3 |

TABLE 2

| | Temperature for burning (° C.) | Time for burning (minutes) | Rate of temperature increase (° C./second) | Photoelectromotive current (μA) | |
|---|---|---|---|---|---|
| | | | | When quenched | When not quenched (naturally cooled) |
| Example 1 | 1000 | 4 | 7 | 24.0 | 1.0 |
| | 1000 | 30 | 7 | 9.7 | 1.1 |
| Example 2 | 810 | 4 | 5 | 15.8 | 2.3 |
| | 810 | 30 | 5 | 9.2 | 1.7 |
| Example 3 | 700 | 4 | 5 | 7.2 | 2.0 |
| | 700 | 30 | 5 | 8.0 | 2.9 |

TABLE 3

| | Temperature for burning (° C.) | Time for burning (minutes) | Rate of temperature increase (° C./second) | Photoelectromotive current (μA) (when quenched) |
|---|---|---|---|---|
| Example 1 | 1000 | 4 | 7 | 24.0 |
| | 1000 | 30 | 7 | 9.7 |
| | 1000 | 30 | 0.5 | 8.6 |
| Example 2 | 810 | 4 | 5 | 15.8 |
| | 810 | 30 | 5 | 9.2 |
| | 810 | 30 | 0.5 | 4.6 |
| Example 3 | 700 | 4 | 5 | 7.2 |
| | 700 | 30 | 5 | 8.0 |
| | 700 | 30 | 0.5 | 3.6 |

What is claimed is:

1. A manufacturing method for a semiconductor photoelectrochemical cell, comprising the steps of:
   burning a base made of titanium or a titanium alloy in an atmosphere of 810° C. to 1000° C. at a rate of temperature increase of no lower than 5° C./second so that a titanium oxide layer is formed on a surface, and thus, mixing titanium metal into said titanium oxide layer on the surface
   wherein the thickness of the titanium oxide layer is 0.1 μm to 30 μm, and
   wherein mechanical processing is additionally carried out in order to partially remove said titanium oxide layer that has been generated, so that the surface area of titanium metal in said titanium oxide layer becomes 10% to 30%.

2. The manufacturing method for a semiconductor photoelectrochemical cell according to claim 1, wherein
   the base is cooled in cold water of no warmer than 10° C. to peel a part of the titanium oxide layer, after a titanium oxide layer has been formed on the surface through burning.

3. A manufacturing method for a semiconductor photoelectrochemical cell, comprising the steps of:
   burning a base made of titanium or a titanium alloy in an atmosphere of 900° C. to 1000° C. at a rate of temperature increase of no lower than 5° C./second so that a titanium oxide layer is formed on a surface; and
   after that, quenching the base in cold water so that titanium metal is mixed into said titanium oxide layer on the surface
   wherein the thickness of the titanium oxide layer is 0.1 μm to 30 μm, and
   mechanical processing is additionally carried out in order to partially remove said titanium oxide layer that has been generated, so that the surface area of titanium metal in said titanium oxide layer becomes 10% to 30%.

4. The manufacturing method for a semiconductor photoelectrochemical cell according to claim 3, wherein
   the base is cooled in cold water of no warmer than 10° C. to peel a part of the titanium oxide layer, after a titanium oxide layer has been formed on the surface through burning.

5. A method for manufacturing a titanium oxide serving as an N type oxide semiconductor and having photocatalyst effect, comprising the steps of:
   providing a base made of titanium or a titanium alloy;
   heating and sintering the base in an atmosphere of 700° C. to 1000° C. at a temperature ascending rate of at least 5° C./second to form a titanium oxide layer on a surface of the base; and
   quenching the base on which the titanium oxide layer is formed to create cracks in the titanium oxide layer, whereby titanium metal is exposed in the titanium oxide layer having a thickness of 0.1-30 μm, wherein the exposed area of the titanium metal is 10% to 30% of a total area of the titanium oxide layer including the cracks.

6. The method according to claim 5, wherein the quenching step comprises cooling the base with the titanium oxide layer in cold water of about 10° C. or lower.

7. The method according to claim 5, further comprising mechanically removing a part of the titanium oxide layer after the quenching step.

8. A method for manufacturing a titanium oxide serving as an N type oxide semiconductor and having photocatalyst effect, comprising the steps of:
   providing a base made of titanium or titanium alloy; heating and sintering the base in an atmosphere of 700° C. to 810° C. at a temperature ascending rate of at least 5° C./second to form a titanium oxide layer on a surface of the base;
   quenching the base on which the titanium oxide layer is formed without creating cracks in the titanium oxide layer; and
   exposing titanium metal in the titanium oxide layer having a thickness of 0.1 to 30 μm,
   wherein the exposed area of the titanium metal is 10% to 30% of a total area of the titanium oxide layer.

9. The method according to claim 8, wherein the base with the titanium oxide layer is cooled in cold water of about 10° C. or lower.

10. The method according to claim 8, wherein a part of the titanium oxide layer is mechanically removed after the quenching step.

* * * * *